United States Patent
Froment et al.

(10) Patent No.: US 10,754,618 B2
(45) Date of Patent: Aug. 25, 2020

(54) RANDOM NUMBER GENERATOR

(71) Applicants: STMicroelectronics (Rousset) SAS, Rousset (FR); STMicroelectronics (Crolles 2) SAS, Crolles (FR)

(72) Inventors: Benoit Froment, Grenoble (FR); Sebastien Petitdidier, La Terrasse (FR); Mathieu Lisart, Aix en Provence (FR); Jean-Marc Voisin, Chateauneuf-le-Rouge (FR)

(73) Assignees: STMicroelectronics (Rousset) SAS, Rousset (FR); STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 16/035,798

(22) Filed: Jul. 16, 2018

(65) Prior Publication Data
US 2019/0034168 A1     Jan. 31, 2019

(30) Foreign Application Priority Data
Jul. 27, 2017 (FR) ...................................... 17 57143

(51) Int. Cl.
*G06F 7/58* (2006.01)
*H01L 21/768* (2006.01)
*G06F 21/70* (2013.01)
*H04L 9/08* (2006.01)

(52) U.S. Cl.
CPC .............. *G06F 7/588* (2013.01); *G06F 21/70* (2013.01); *H01L 21/76829* (2013.01); *H04L 9/0866* (2013.01)

(58) Field of Classification Search
CPC ...... G06F 7/588; G06F 21/70; H01L 21/76829
USPC ................................................... 708/250–256
See application file for complete search history.

(56) References Cited

U.S. PATENT DOCUMENTS

| | | |
|---|---|---|
| 2013/0083586 A1 | 4/2013 | Petitprez |
| 2013/0101114 A1* | 4/2013 | Kim .................. G06F 21/73 380/44 |
| 2013/0233608 A1 | 9/2013 | Feng et al. |
| 2014/0042627 A1 | 2/2014 | Edelstein et al. |
| 2014/0136852 A1 | 5/2014 | Minassian |
| 2016/0170856 A1* | 6/2016 | Kim .................. G09C 1/00 702/182 |
| 2016/0247769 A1* | 8/2016 | Choi ................. G06F 21/73 |
| 2016/0330038 A1* | 11/2016 | Kim .................. G06F 21/73 |
| 2016/0335458 A1* | 11/2016 | Kim .................. G06F 21/73 |
| 2017/0187537 A1* | 6/2017 | Kim .................. H04L 9/0866 |
| 2017/0324409 A1 | 11/2017 | Martinez et al. |

OTHER PUBLICATIONS

Jeon, Duhyun, et al., "Circuit Design of Physical Unclonable Function for Security Applications in Standard CMOS Technology", 2016 IEEE International Conference on Electron Devices and Solid-State Circuits (EDSSC), Aug. 3, 2016, pp. 86-90.

* cited by examiner

*Primary Examiner* — Tan V Mai
(74) *Attorney, Agent, or Firm* — Slater Matsil, LLP

(57) ABSTRACT

A random number generation device includes conductive lines including interruptions and a number of conductive vias. A via is located at each interruption. Each via randomly fills or does not fill the interruption. A circuit is capable of determining the electric continuity or lack of continuity of the conductive lines.

23 Claims, 3 Drawing Sheets

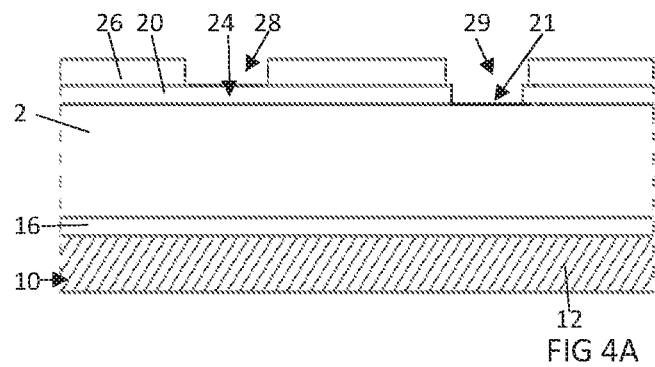
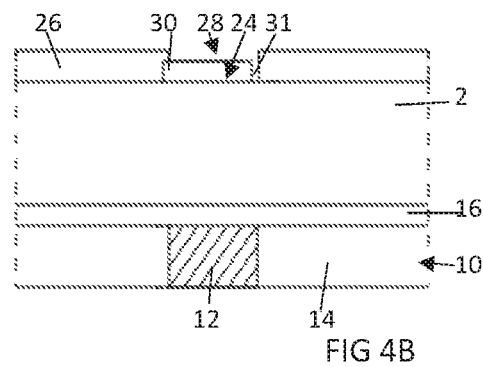
FIG 4A / FIG 4B
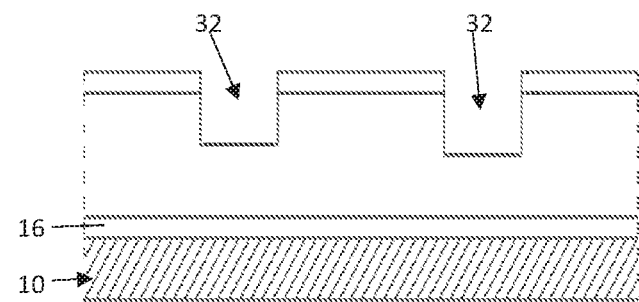
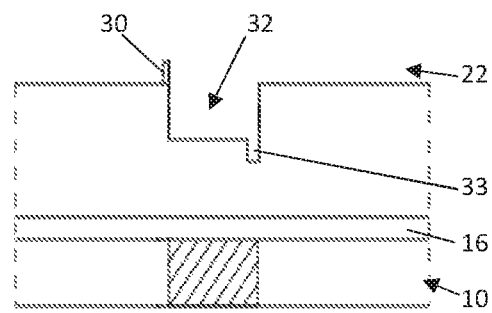
FIG 5A / FIG 5B
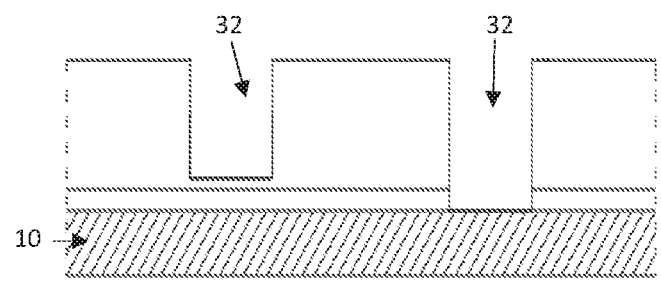
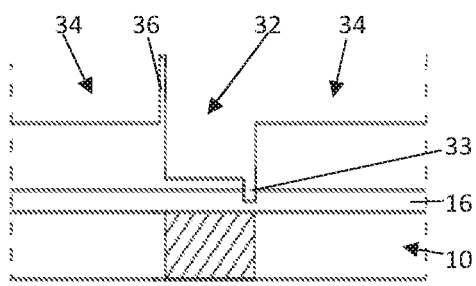
FIG 6A / FIG 6B
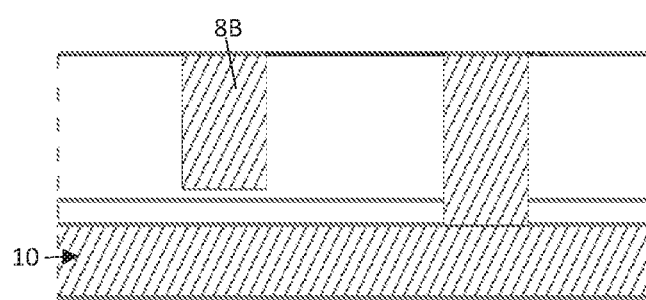
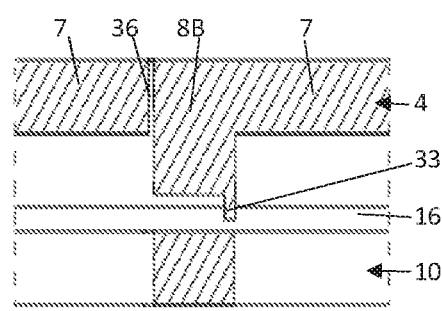
FIG 7A / FIG 7B

RANDOM NUMBER GENERATOR

CROSS-REFERENCE TO RELATED APPLICATIONS

This application claims priority to French Patent Application No. 1757143, filed on Jul. 27, 2017, which application is hereby incorporated herein by reference.

TECHNICAL FIELD

The present disclosure relates to the field of electronic chips and more particularly to a device for generating a random number associated with a chip, and to a method of manufacturing the same.

BACKGROUND

Many tasks are currently executed on on-line platforms, for example, with cell phones. Such tasks may include an exchange of confidential data such as bank data or personal information. To secure such exchanges, it is necessary to be able to efficiently identify devices such as cell phones or, more specifically, the electronic chips which are associated therewith.

A usual solution comprises using physical unclonable functions or PUF. This comprises using random variations of physical characteristics of a chip occurring on manufacturing thereof to generate a random identification number which is specific to the chip.

PUFs, in addition to being used for chip identification, may be used to generate the encryption keys specific to the chip.

SUMMARY

Embodiments of the present description at least partially address one or more problems in the prior art.

An embodiment provides a random number generation device comprising conductive lines comprising interruptions and conductive vias. A via is located at each interruption, each via randomly filling or not the interruptions. A circuit is capable of determining the electric continuity or lack of continuity of the conductive lines.

According to an embodiment, the conductive lines are metallizations of a level of an interconnection network.

According to an embodiment, each conductive via connects or not, randomly, a conductive line to a lower level of the interconnection network.

According to an embodiment, the probability for a line to be interrupted is in the range from 40% to 60%.

According to an embodiment, the random number comprises at least 128 values.

According to an embodiment, each interruption is located between two ends of line portions.

According to an embodiment, each interruption is located between three ends of line portions.

According to an embodiment, at least one conductive line is partially on a level of an interconnection network and partially on another level.

According to an embodiment, the circuit is capable of measuring the resistance between the ends of the conductive lines.

According to an embodiment, each interruption comprises a single via.

An embodiment provides a method of manufacturing a random number generation device. A first mask is formed on an insulator layer. The first mask comprises first openings for defining conductive lines and the conductive lines comprise interruptions. A second mask is formed on the first mask. The second mask comprises second openings for defining vias. The second mask is placed in such a way that a via location is located opposite each line interruption. The lateral dimensions of the second openings are selected according to the manufacturing technology so that, randomly, each via fills or does not fill the interruptions.

According to an embodiment, the insulator layer forms a level of an interconnection network.

According to an embodiment, the manufacturing method comprises etching first cavities through the first via definition openings of the second mask without reaching the lower level of the interconnection network. The mask is removed and second cavities are etched through the first openings. The bottoms of the first cavities are etched to reach the lower level. The first mask is removed and the first and second cavities are filled with conductive material.

The foregoing and other features and advantages will be discussed in detail in the following non-limiting description of specific embodiments in connection with the accompanying drawings.

BRIEF DESCRIPTION OF THE DRAWINGS

FIGS. 3A to 7A are cross-section views according to a line A-A of steps of the method of manufacturing a device such as that in FIG. 1;

FIGS. 3B to 7B are cross-section views along a line B-B of steps of the method of manufacturing a device such as that in FIG. 1.

DETAILED DESCRIPTION OF ILLUSTRATIVE EMBODIMENTS

Figure 1:
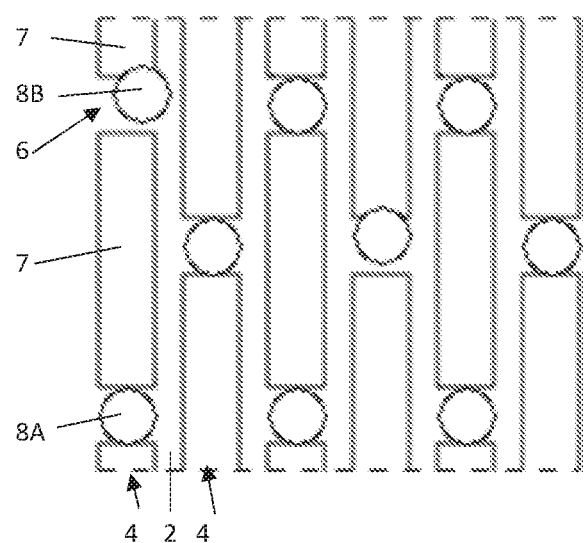
FIG. 1 schematically shows an embodiment of a random number generation device.

The same elements have been designated with the same reference numerals in the various drawings and, further, the various drawings are not to scale. For clarity, only those steps and elements which are useful to the understanding of the described embodiments have been shown and are detailed. In particular, the measurement circuit is neither shown nor described in detail.

In the following description, when reference is made to terms qualifying the relative position, such as term "left", "right", "lower", etc., reference is made to the orientation of the concerned elements in the drawings. The term "approximately" is used herein to designate a tolerance of plus or minus 10%, preferably plus or minus 5%, of the value in question.

FIG. 1 schematically shows an embodiment of a random number generation device and more particularly of a PUF. FIG. 1 is a top view of an insulator layer 2 having conductive lines 4, only small portions of which are illustrated, located therein. Conductive lines 4 comprise interruptions 6 which divide lines 4 into a plurality of line portions 7. A single via 8 is located at the level of each interruption 6.

Among vias 8, some vias 8A, fill interruption 6 at the level of which they are used and form an electric connection between the two portions of conductive line 7. Specifically, each via 8A, filling an interruption, is in contact with both portions of conductive line 7. Other vias 8B, due to their location and/or to their dimensions, do not fill interruption 6 at the level of which they are used and do not form an electric connection between the two line portions 7.

Conductive lines 4 are for example metallizations formed in a level of an interconnection network and are for example made of copper. Insulator layer 2 is for example made of silicon oxide. Vias 8 are, for example, tungsten vias normally intended to connect two levels of an interconnection network.

An electric circuit, not shown, is used to determine the electric continuity of lines 4, for example, by measuring the resistance between the two ends of lines 4. It is then possible to generate binary data from the state of each line. If the resistance measured between the two ends of a line indicates a continuous line, that is, only comprising vias 8A, the line corresponds to a first binary value, for example, 0. If the measured resistance indicates an interrupted line, that is, comprising at least one via 8B, the line corresponds to the second binary value, for example, 1. Of course, the logic values can be switched.

FIG. 1 shows six small line portions, each comprising one or two vias. The first line, starting from the left, comprises a via 8A and a via 8B, the fourth line comprises a via 8B. The other lines comprise one or two vias 8A. The binary number generated by the six shown lines is thus 100100, if there are no vias 8B in the remaining portions of the second, third, fifth, and sixth lines.

The presence of vias 8B is due to inaccuracies occurring randomly during the manufacturing of vias 8A. According to a first example, certain vias may not be placed correctly with respect to the line portions. According to a second example, the diameter of certain vias may be smaller than the diameter enabling to fill the interruptions. The electric continuity or lack of continuity of each line is thus random.

Simulations have shown that, for a given technology, the resistances measured at the ends of the conductive lines may be divided into two clearly distinct ranges of values, one corresponding to interrupted lines and the other corresponding to continuous lines. These ranges of values may vary according to criteria such as the number of interruptions 6, and thus of vias, in each line, the lateral dimensions of the vias, as well as the length of conductive lines 4. Such criteria also enable to approximately select the probability, for a line, of being continuous or interrupted. The probability for a line of being interrupted, that is, of comprising at least one via 8B, is preferably selected between 40% and 60%.

Thus, for a given technology, it is possible to determine a number of vias per line, for example, 1,000 vias, and dimensions of the vias and of the lines for which there is a probability of approximately 50% for at least one via out of one thousand to be a via 8B.

A sufficiently large number of lines, for example, 128 lines, enable the ascertainment that the obtained random number is specific to the chip.

The device thus generates a random identification number specific to the chip from characteristics specific to the chip.

It is possible to form sets of lines, each of which corresponds to a digital value at different locations of the chip and on different metallization levels. Further, dummy lines, similar to the conductive lines but without taking part in the generation of the identification number, may be formed to mislead a pirate which would attempt to determine the identification number. Further, the same line may be partially located on several levels of the interconnection network. It is thus difficult for a pirate to find the different lines forming the identification number.

In the structure schematically shown in FIG. 1, it is easy to distinguish vias 8A from vias 8B with the naked eye, which is not true in a real device. It is not always possible to distinguish them without electrically testing the continuity of the conductive lines, which is difficult for pirates when the dimensions are small.

FIGS. 2, 3A to 7A and 3B to 7B illustrate a method of manufacturing a chip comprising a device such as that described in relation with FIG. 1. More specifically, the method described in relation with FIGS. 2, 3A to 7A and 3B to 7B describes the forming of a via at the level of an interruption and the forming of a via of connection to the lower level of the interconnection network at the level of a continuous portion of a conductive lines 4.

Figure 2:
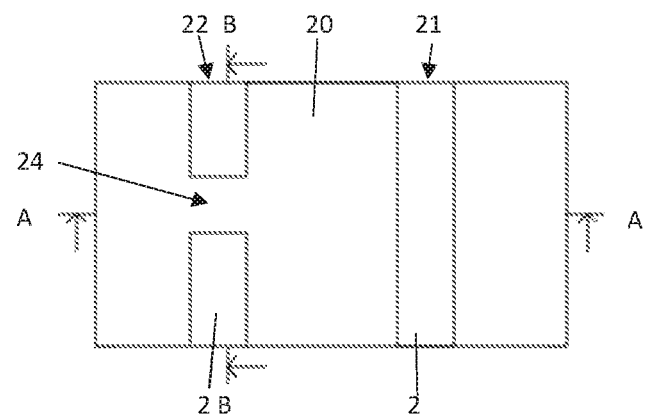
FIG. 2 is a top view of a step of an embodiment of a method of manufacturing a device such as that of FIG. 1.
Figures 3A, 3B:
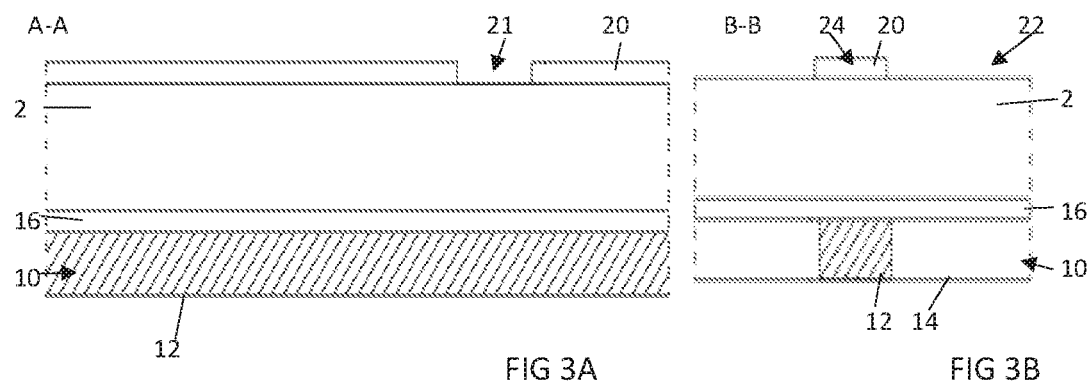

FIG. 2 is a top view of the chip at an initial manufacturing step. FIGS. 3A and 3B are cross-section views respectively along lines A-A and B-B of FIG. 2.

The chip comprises a level 10 of an interconnection network (FIGS. 3A and 3B). It is for example the second metallization level of the interconnection network. Level 10 here comprises metallizations 12, one of which is shown, extending in an insulator layer 14 in the direction of line A-A.

Level 10 is covered with a layer 16 of insulator, for example, silicon nitride, capable of being used as an etch stop layer. Layer 16 is covered with insulator layer 2, for example, made of silicon oxide.

A first mask 20 is formed on layer 2. Mask 20 comprises openings for defining lines comprising interruptions.

In particular, FIG. 2 partially shows openings for defining lines, one 21 being continuous and the other 22 comprising an interruption 24 at the level of which mask 20 is not open.

Mask 20 is for example a hard mask made of titanium nitride or of tantalum nitride.

FIGS. 4A and 4B are cross-section views along the same lines as FIGS. 3A and 3B at a next step of the method. During this step, a second mask 26 is formed on first mask 20. Mask 26 comprises via definition openings 28 and 29. Openings 28 are located on interruptions 24 for the forming of vias 8A and 8B, as shown in the left-hand portion of FIG. 4A and in FIG. 4B. Openings 28 are thus located at the level of a non-open portion of mask 20. Openings 29 are located on openings 21 for defining conductive lines 4 for the forming of the vias of connection to the lower level of the interconnection network, as shown in the right-hand portion of FIG. 4A.

The diameter of via definition openings 28 and 29 is selected to fully expose interruptions 24 and enable them to be etched. The diameter of the openings should thus be at least as large as the largest dimension of interruption 24.

However, placing or sizing inaccuracies occur on forming of mask 26 and modify openings 28 and 29. Opening 28 shown in FIG. 4B is shifted to the right with respect to the initially selected position. A peripheral portion 30 of the portion of mask 20 forming interruption 24 is thus protected by second mask 26 and a small portion 31 of layer 2 is exposed.

FIGS. 5A and 5B are cross-section views along the same lines as FIGS. 4A and 4B at a next step of the method.

During this step, cavities 32 are etched through the openings of mask 26, which is then removed. The etching is stopped before reaching insulator layer 16. The distance between the bottom of cavity 32 and level 10 is approximately equal to the height of the cavities, which will be subsequently etched to form the conductive lines.

As illustrated in FIG. 5A, the presence of mask 20 under opening 28 and not under opening 29 causes a difference in etch depths in insulator layer 2. However, the exact depth difference is subject to uncertainty.

As illustrated in FIG. 5B, the portion of mask 20 forming interruption 24 is etched through opening 28, except for the portion protected by mask 26. Portion 30 of mask 20 is thus always present on layer 2 between the opening of cavity 32 and a portion of line definition opening 22.

Portion 31 of insulator layer 2 is not covered with mask 20 and is directly etched. This causes the forming of a portion 33 of cavity 32 shallower than the rest of the cavity.

FIGS. 6A and 6B are cross-section views along the same lines as FIGS. 5A and 5B at a next step of the method. This step is a new etch step during which cavities 34 are etched through the openings of mask 20, and the bottoms of cavities 32 are etched to reach the metallizations of lower level 10. Cavities 32 having been etched less deeply at the step of FIGS. 5A and 5B due to the presence of mask 20 under the opening may, randomly, not reach metallization 12 of level 10, as illustrated in FIG. 6A.

As illustrated in FIG. 6B, insulator layer 2 is partially protected during the etching by portion 30 of mask 20. The protected portion forms an insulator wall 36 which is located between a cavity 34 and cavity 32.

FIGS. 7A and 7B are cross-section views along the same lines as FIGS. 6A and 6B at a next step of the method. During this step, cavities 32 and 34 are filled with a conductive material, for example, copper, to form conductive lines 4 and the conductive vias.

The presence of an insulator wall 36 between a portion of line 7 and via 8B prevents the electric continuity of line 4, as illustrated in FIG. 7B.

The forming of vias 8B may also occur when opening 28 is correctly placed but has dimensions smaller than the selected dimensions. There then is a wall 36 between via 8B and each portion 7.

In the case of vias 8A, the opening has the correct dimensions and position so that the interruption is filled.

As a variation, the depth of vias 8A and 8B may be used in the forming of the random number in the same way as the position and the lateral dimensions of the vias. For example, a line may be formed of a portion in a level of the interconnection network and of another portion in a lower level, the two portions being randomly connected or not by a via 8A or 8B. Thus, there may or may not be an electric continuity between the ends of the line according to the length of the via.

As a variation, the interruptions may be located between more than two portions of conductive line 7. It is for example possible to form a grid of lines interrupted at their intersections or any other line pattern. The measurement circuit can then measure a characteristic between various line ends.

FIGS. 8A to 8H illustrate a via 40 located between three conductive line portions 42. More particularly, FIGS. 8A to 8H show the eight possible states of via 40. In the next drawings, the hatched line portions 42 are in lateral contact with via 40. It is for example considered that a measurement circuit, not shown, measures the resistance between portions two by two to determine whether or not there is an electric connection between the portions. The different portions 42 for example have a different length and thus a different resistance.

Figure 8A:
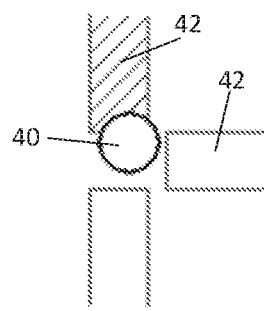
FIGS. 8A to 8H show several states of another embodiment of a random number generation device.
Figure 8B:
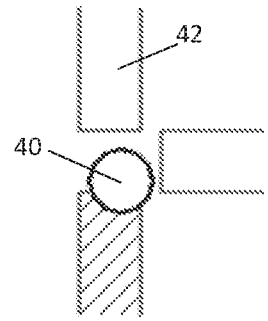
Figure 8C:
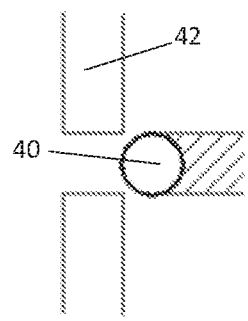
Figure 8D:
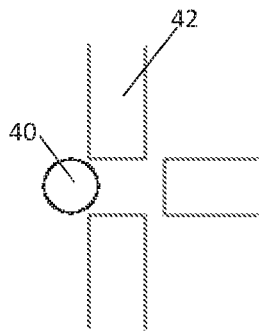

FIGS. 8A to 8C show the case where via 40 is in contact with a single one of the three line portions 42. FIG. 8D shows the case where via 40 is not in contact with any of portions 42. There thus is no electric connection between the three line portions. The four states cannot be differentiated by a measurement, for example, of the resistance, and thus correspond to a same value.

Figure 8E:
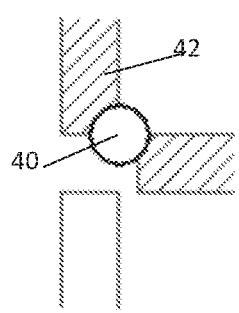
Figure 8F:
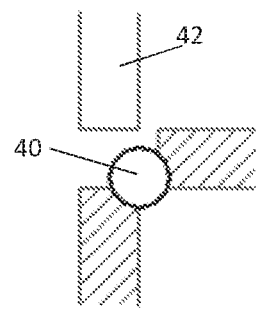
Figure 8G:
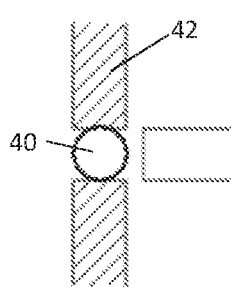
Figure 8H:
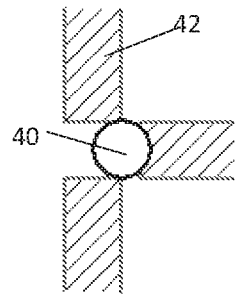

FIGS. 8E to 8G show the case where two of the three line portions are connected by via 40. FIG. 8H shows the case where the three line portions are in contact with the via. Each of these states corresponds to a different value.

A via 40 between three line portions 42 thus enables to obtain five different values.

The line pattern may be other than rectilinear. For example, the lines may have a spiral shape or a coil shape.

An advantage of the embodiments described herein is that they are difficult to track.

Another advantage of these embodiments is that their forming only contains usual interconnection network level manufacturing steps, which are carried out during the manufacturing of the vias of the interconnection network.

Another advantage of such embodiments is that they are adapted to any technology.

Specific embodiments have been described. Various alterations, modifications and improvements will readily occur to those skilled in the art. In particular, in the above description, the measured characteristic between the line ends is the resistance. It would however be possible to measure the capacitance or other characteristics.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A semiconductor device, comprising:
    a plurality of conductive paths, wherein each of the plurality of conductive paths comprises, within a metal level, a plurality of discrete metal lines and a plurality of interruptions, adjacent ones of the plurality of discrete metal lines in the metal level being separated by one of the plurality of interruptions;
    a plurality of conductive vias, each of the plurality of conductive vias being located at an associated one of the plurality of interruptions, wherein the plurality of conductive vias comprises a first type of vias and a second type of vias, wherein the first type of vias fill the associated one of the plurality of interruptions, and the second type of vias do not fill the associated one of the plurality of interruptions; and
    wherein an identification number of the semiconductor device is determinable from the plurality of conductive paths, and wherein each of the plurality of conductive paths correspond to a digit value of the identification number based on a number of the first type of vias and the second type of vias in the corresponding conductive path.

2. The device of claim 1, wherein the conductive paths of the plurality of conductive paths are metallizations of a level of an interconnection network.

3. The device of claim 2, wherein each conductive via of the first type of vias of a conductive path of the plurality of conductive paths connects the conductive path with a lower level of the interconnection network.

4. The device of claim 3, wherein each conductive via of the second type of vias of the conductive path of the plurality of conductive paths does not connect the conductive path with of the interconnection network.

5. The device of claim 1, wherein between 40% and 60% of the plurality of conductive vias comprise the first type of vias.

6. The device of claim 1, wherein the identification number comprises at least 128 values.

7. The device of claim 1, wherein the associated one of the plurality of interruptions of at least one conductive via of the plurality of conductive vias separates three adjacent discrete metal lines.

8. The device of claim 1, wherein a multi-level conductive path of the plurality of conductive paths is partially on a level of an interconnection network and partially on another level of the interconnection network.

9. The device of claim 1, wherein at least one of the second type of vias is misaligned with at least one of the adjacent discrete metal lines separated by the at least one of the second type of vias.

10. The device of claim 1, wherein one conductive via of the plurality of conductive vias is located at each interruption.

11. The device of claim 1, further comprising a sense circuit configured to measure an electrical continuity or lack of electrical continuity to determine the digit value for each of the plurality of conductive paths.

12. The device of claim 11, wherein the sense circuit determines the electrical continuity or lack of electrical continuity by measuring the resistance on each of the plurality of conductive paths.

13. The device of claim 1, wherein between 40% and 60% of the plurality of conductive paths contains at least one conductive via of the second type of vias.

14. A method of manufacturing a random number generation device, the method comprising:
forming a first mask on an insulator layer, the first mask comprising a plurality of first openings for defining a plurality of conductive paths wherein each of the plurality of conductive paths comprises, within a metal level, a plurality of discrete metal lines and a plurality of interruptions, adjacent ones of the plurality of discrete metal lines in the metal level being separated by one of the plurality of interruptions;
forming a second mask on the first mask, the second mask comprising a plurality of second openings for defining a plurality of vias, the second mask being placed in such a way that each of the plurality of vias is located at an associated one of the plurality of interruptions; and
applying a conductor within the plurality of vias using a manufacturing technology, lateral dimensions of the plurality of second openings being selected according to the manufacturing technology so inaccuracies randomly occurring during the manufacturing produce a first type of vias that fill the associated one of the plurality of interruptions, and a second type of vias that do not fill the associated one of the plurality of interruptions.

15. The method of claim 14, wherein the insulator layer is part of an interconnection network.

16. The method of claim 15, comprising the steps of:
etching a plurality of first cavities through the plurality of second openings of the second mask without reaching a lower level of the interconnection network;
removing the second mask;
etching a plurality of second cavities through the plurality of first openings, each second cavity extending through a bottom of an associated one of the plurality of first cavities to reach the lower level of the interconnection network;
removing the first mask; and
wherein applying the conductor comprises filling the plurality of first cavities and the plurality of second cavities with conductive material.

17. The method of claim 14, wherein, at least one of the second openings partially overlaps at least one of the first openings so a conductor applied within a via defined by the at least one of the second openings has two distinct thicknesses within the via.

18. A device comprising:
a plurality of lower conductive lines;
an interlevel dielectric layer overlying the lower conductive lines;
a plurality of upper conductive lines overlying the interlevel dielectric layer, each upper conductive line extending over more than one of the lower conductive lines;
a plurality of vias, each via located at an intersection between an associated one of the plurality of lower conductive lines and an associated one of the plurality of upper conductive lines, a resistance between the associated one of the plurality of lower conductive lines and the associated one of the plurality of upper conductive lines being either higher than a threshold or lower than the threshold due to an alignment of the via; and
a sense circuit configured to determine whether the resistance between the associated one of the plurality of lower conductive lines of a via and the associated one of the plurality of upper conductive lines of the via is higher than the threshold or lower than the threshold.

19. The device of claim 18, wherein the lower conductive lines of the plurality of lower conductive lines and the upper conductive lines of the plurality of upper conductive lines are metallizations of a level of an interconnection network of an integrated circuit, the sense circuit being part of the integrated circuit.

20. The device of claim 18, wherein the plurality of vias comprises a first type of vias that connects the associated one of the plurality of lower conductive lines with the associated one of the plurality of lower conductive lines of and a second type of vias that does not connect the associated one of the plurality of lower conductive lines with the associated one of the plurality of upper conductive lines.

21. The device of claim 18, wherein the resistance between the associated one of the plurality of lower conductive lines and the associated one of the plurality of upper conductive lines is higher than the threshold for between 40% and 60% of the vias.

22. The device of claim 18, wherein a multilevel conductive line is partially on a level of an interconnection network and partially on another level of the interconnection network.

23. The device of claim 18, wherein an identification number of the device is determinable from a plurality of conductive paths, wherein each of the plurality of conductive paths comprises at least one upper conductive line and at least one lower conductive line and wherein each of the plurality of conductive paths correspond to a digit value of the identification number based on the resistance the conductive path.

* * * * *